(12) United States Patent
Icenogle et al.

(10) Patent No.: US 10,859,465 B2
(45) Date of Patent: Dec. 8, 2020

(54) METHOD AND APPARATUS FOR THE MEASUREMENT OF THE REFRACTION INDEX OF A HYDROGEL CONTACT LENS

(71) Applicant: Alcon Inc., Fribourg (CH)

(72) Inventors: David Andrew Icenogle, Brookhaven, GA (US); Yeming Gu, Suwanee, GA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/708,861

(22) Filed: Dec. 10, 2019

(65) Prior Publication Data

US 2020/0191683 A1 Jun. 18, 2020

Related U.S. Application Data

(60) Provisional application No. 62/779,129, filed on Dec. 13, 2018.

(51) Int. Cl.
*G01M 11/02* (2006.01)

(52) U.S. Cl.
CPC .... *G01M 11/0214* (2013.01); *G01M 11/0228* (2013.01)

(58) Field of Classification Search
CPC ............... G02B 1/043; G02B 24/0172; G02B 2027/0138; G02B 2027/0178; G02B 27/0176; G02B 3/0056; G02B 5/08; G02B 17/04; G02B 17/08; G02B 1/18; G02B 2027/0118; G02B 2027/0123; G02B 2027/014; G02B 2027/015; G02B 2027/0169; G02B 2027/0174; G02B 2027/0187; G02B 26/08; G02B 27/0093; G02B 27/01; G02B 27/0149; G02B 27/017; G02B 3/0006; G02B 3/0062; G02B 3/04; G02B 5/003; G02B 5/1895; G02B 7/02; G02B 7/023; G02B 7/025; G02B 7/04; G02B 7/09; G02B 9/04; G01N 33/62; G01N 15/1475; G01N 2015/0073; G01N 2015/008; G01N 2015/1006; G01N 2015/1486; G01N 2021/6439; G01N 2035/00138; G01N 2035/00148; G01N 2035/00237; G01N 2035/00306; G01N 2035/00356; G01N 2035/00425; G01N 2035/00435; G01N 2035/00633; G01N 2035/0449; G01N 2035/0474; G01N 2035/0486; G01N 2035/0491;

(Continued)

(56) References Cited

U.S. PATENT DOCUMENTS 5,817,924 A * 10/1998 Tuomela ............ G01N 15/0806
73/38
5,847,819 A * 12/1998 Yanagi ............... G01M 11/0207
356/124

(Continued)

OTHER PUBLICATIONS

Mousa G. Y., et al., "The Effects of the Hydration Characteristics of Hydrogel Lenses on the Refractive Index", International Contact Lens Clin., Jan./Feb. 1983, pp. 31-37, vol.-issue 10-1.

*Primary Examiner* — Michael P Stafira
(74) *Attorney, Agent, or Firm* — Sheng-Hsin Hu (57) ABSTRACT

The invention is generally directed to an apparatus and a method for measuring a refractive index of a soft contact lens under a consistent pressure.

6 Claims, 11 Drawing Sheets

(58) Field of Classification Search
CPC ... G01N 2035/0493; G01N 2035/0494; G01N 21/25; G01N 21/27; G01N 21/31; G01N 21/3554; G01N 21/359; G01N 21/6428; G01N 2201/024; G01N 2201/104; G01N 2201/12; G01N 31/22; G01N 33/0027; G01N 33/02; G01N 33/5005; G01N 33/542; G01N 33/54306; G01N 33/54313; G01N 33/54366; G01N 33/56983; G01N 33/66; G01N 33/6827; G01N 33/80; G01N 33/92; G01N 35/00029; G01N 36/00069; G01N 35/00623; G01N 35/04; G01N 35/10; G01N 35/1009; G01N 35/1011; G01N 35/1065; G01N 35/1072; G01N 21/78; G01N 2035/00326; G01N 21/6456; G01N 21/8483; G01N 35/0092; G01N 2015/0065; G01N 2015/1497; G01N 2021/7786; G01N 2035/00495; G01N 21/76; G01N 2201/0221; G01N 35/00; G01N 35/00871; G01N 15/1429; G01N 15/1463; G01N 15/147; G01N 15/1484; G01N 2015/149; G01N 2035/00366; G01N 2035/00881; G01N 21/474; G01N 21/49; G01N 21/6458; G01N 21/77; G01N 33/4833; G01N 33/5302; G01N 33/543; G01N 33/54386; G01N 33/558; G01N 33/78; G01N 35/026; G01N 15/0211; G01N 15/0227; G01N 15/06; G01N 15/0612; G01N 15/10; G01N 15/14; G01N 15/1427; G01N 15/1434; G01N 15/1436; G01N 15/1459; G01N 15/1468; G01N 1/38; G01N 2015/0693; G01N 2015/1075; G01N 2015/1087; G01N 2015/1093; G01N 2015/1402; G01N 2015/1481; G01N 2015/1493; G01N 2021/0156; G01N 2021/1746; G01N 2021/1765; G01N 2021/3181; G01N 2021/513; G01N 2021/637; G01N 2021/6415; G01N 2021/6417; G01N 2021/6441; G01N 2021/6463; G01N 2021/6471; G01N 2021/6493; G01N 2021/653; G01N 2021/755; G01N 2030/8827; G01N 2035/00277; G01N 2035/00445; G01N 2035/0094; G01N 2035/103; G01N 2035/1048; G01N 21/01; G01N 21/05; G01N 21/07; G01N 21/1702; G01N 21/255; G01N 21/3103; G01N 21/314; G01N 21/35; G01N 21/3563; G01N 21/3577; G01N 21/3581; G01N 21/3586; G01N 21/453; G01N 21/4788; G01N 21/51; G01N 21/554; G01N 21/63; G01N 21/636; G01N 21/6402; G01N 21/6454; G01N 21/6486; G01N 21/65; G01N 21/80; G01N 21/94; G01N 2201/04; G01N 2201/0612; G01N 2201/062; G01N 2201/0633; G01N 2201/068; G01N 2201/0697; G01N 2203/0039; G01N 2291/02475; G01N 2333/05; G01N 2333/705; G01N 2496/05; G01N 27/333; G01N 2800/042; G01N 29/00; G01N 29/0654; G01N 29/2418; G01N 29/44; G01N 30/88; G01N 33/08; G01N 33/1826; G01N 33/487; G01N 33/50; G01N 33/5094; G01N 33/52; G01N 33/53; G01N 33/5304; G01N 33/56966; G01N 33/46972; G01N 33/57407; G01N 33/57411; G01N 33/70; G01N 35/00069; G01N 35/00732; G01N 3/30; G01J 3/0208; G01J 3/36; G01J 2003/2826; G01J 3/0205; G01J 3/0216; G01J 3/0256; G01J 3/0262; G01J 3/0264; G01J 3/027; G01J 3/0272; G01J 3/0283; G01J 3/0286; G01J 3/0291; G01J 3/0297; G01J 3/06; G01J 3/10; G01J 3/26; G01J 3/2823; G01J 3/32; G01J 3/0218; G01J 3/0229; G01J 3/4406; G01J 3/46; G01J 3/51

See application file for complete search history.

(56) References Cited

U.S. PATENT DOCUMENTS

| | | | | |
|---|---|---|---|---|
| 6,068,798 | A * | 5/2000 | Lesczynski | B29C 71/0009 134/901 |
| 6,147,751 | A * | 11/2000 | Abitbol | G01M 11/0228 356/124 |
| 2015/0204756 | A1 * | 7/2015 | Ignatovich | G01M 11/0285 356/73 |
| 2019/0233573 | A1 * | 8/2019 | Scales | C08G 18/04 |
| 2019/0323920 | A1 * | 10/2019 | Smorgon | G01M 11/0214 |

* cited by examiner

Fig. 11

METHOD AND APPARATUS FOR THE MEASUREMENT OF THE REFRACTION INDEX OF A HYDROGEL CONTACT LENS

This application claims the benefit under 35 USC § 119 (e) of U.S. provisional application No. 62/779,129, filed on 13 Dec. 2018, incorporated by reference in its entirety.

The present invention relates to the determination of the refractive index of a submerged soft contact lens. In the manufacturing of lenses, obtaining very accurate measurements of the refractive index of the lens material is a challenging problem. Typical refractometers are designed to measure liquids in a thin film state, which results in variable pressure and hydration of contact lenses during measurement. Overall, this causes significant operator influence over the measurement and substantial training of operators for consistent measurements. It also subsequently reduces the accuracy of the measurement since the lens is not submerged in a liquid for example a saline.

Hence, there remains an unmet need for a measurement method and apparatus that enables the accurate determination of the refractive index of the soft contact lens.

SUMMARY

The present invention directs to a method for measuring a refractive index of a hydrogel contact lens using a critical-angle refractometer comprising a flat prism interface surface, a light source that radiates light to the interface surface and a photoelectric sensor for receiving light reflected from the interface surface, the method comprising:
a) adding a solution to a cavity, wherein the cavity is located on the top surface of the refractometer, concavely shaped and contains the flat prism interface at the bottom,
b) placing the hydrogel contact lens on the top of a flat zone of a contact lens arm fixture which is pivotally connected to the refractometer,
c) pivotally turning the hydrogel contact lens arm fixture toward the cavity to contact the hydrogel contact lens with the liquid and the flat prism interface in the cavity, wherein the hydrogel contact lens maintains at saturating state by the liquid,
d) applying a predetermined pressure on the hydrogel contact lens arm fixture to contact the hydrogel contact lens with the flat prism interface under the pressure,
e) activating the critical-angle refractometer to measure the refractive index of the hydrogel contact lens after the step of d)

Another aspect of the invention directs to an apparatus for measuring a refractive index of a hydrogel contact lens comprising:
a refractometer, wherein the refractometer having a cavity to hold a solution and the hydrogel contact lens, wherein the cavity is concavely shaped to hold a liquid, temperature controlled, and contains a prism,
a refractometer fixture configured to be connected to the refractometer,
wherein the refractometer fixture comprising:
a fixture stage plate connected to the refractometer,
a fixture arm pivotally connected to the fixture stage plate which is adjustable X, Y, and Z positions,
a hydrogel contact lens fixture connected to the fixture arm and is pivotally moveable to apply a predetermined pressure to the hydrogel contact lens against the prism.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" refers to a polymeric material which can absorb at least 10 percent by weight of water when it is fully hydrated. A hydrogel material can be obtained by polymerization or copolymerization of at least one hydrophilic monomer in the presence of or in the absence of additional monomers and/or macromers or by crosslinking of a prepolymer. A "silicone hydrogel" refers to a hydrogel obtained by copolymerization of a polymerizable composition comprising at least one silicone-containing vinylic monomer or at least one silicone-containing macromer or a silicone-containing prepolymer.

The invention is generally directed to a method for measuring a refractive index of a soft contact lens using a critical-angle refractometer comprising a prism having an interface surface, a light source that radiates light to the interface surface and a photoelectric sensor for receiving light reflected from the interface surface, the method comprising:
a) placing the soft contact lens in a cavity, wherein the cavity containing a prism and having a truncated dome shape to create a small flat zone to hold the soft contact lens against the prism of the critical-angle refractometer,
b) adding a solution to the cavity to cover the soft contact lens,
c) applying a predetermined pressure on the soft contact lens,
d) activating the critical-angle refractometer to measure the refractive index of a soft contact lens after the step of c)

Typical refractometers are designed to measure liquids in a thin film state, which results in variable pressure and variable hydration of contact lenses during measurement. Overall, this causes significant operator influence over the measurement and substantial training of operators for consistent measurements. It also subsequently reduces the accuracy of the measurement since the lens is not submerged in a liquid, for example saline. The advantages which the invention has over the prior solutions are: Significantly less variation in RI measurement of contact lenses, reduced operator variation during RI measurement and hydrogel contact lens is completely hydrated during RI measurement.

Figure 1:
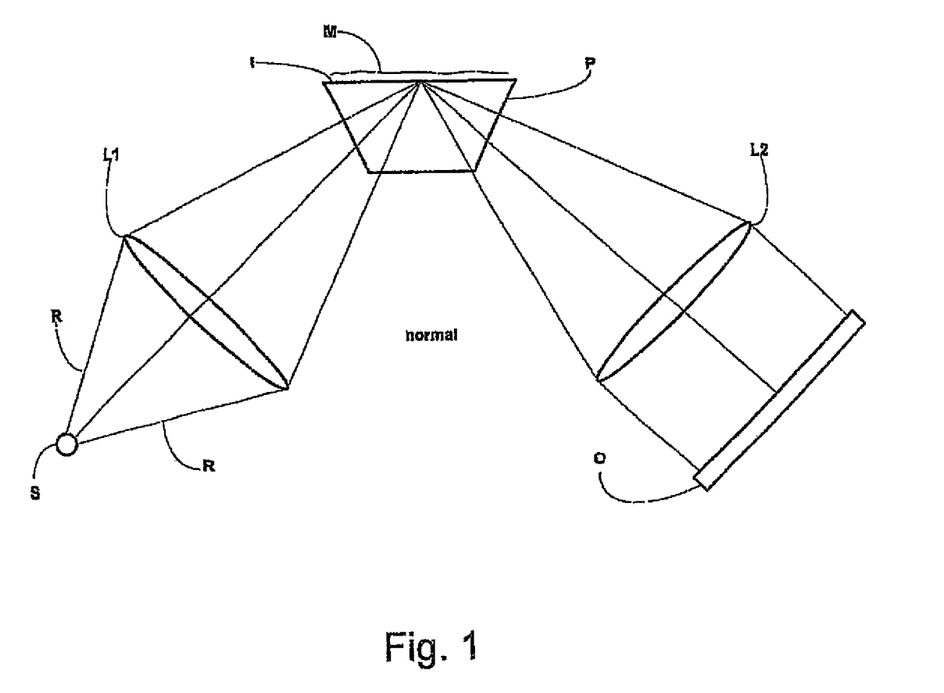
FIG. 1 illustrates a critical-angle refractometer

The purpose of a refractometer is to measure the refractive index of a sample material M, for example, a liquid (for example, a saline solution). A prior art critical-angle refractometer is shown schematically in FIG. 1. The liquid sample M is typically contained in a dish in which one surface of an optical prism P, having a high index of refraction, forms the floor of the dish. Rays of light R from a Light Source S are focused by a Lens L1 into prism P. It is characteristic of the interface between two disparate optical media that a light beam entering the interface will be, in part, refracted or bent upon traversing the interface, and it will be, in part, reflected from the interface. However, for any interface, there is a "critical-angle" such that a light beam incident on the interface with that or a greater angle to the normal will be totally reflected. The critical angle is defined by Equation (1).

$$\text{Sin(critical angle)} = (\text{refractive index of sample})/(\text{refractive index of prism}) \quad (1)$$

By design of the prism/sample interface I in FIG. 1, rays R incident on interface I are at least partially reflected therefrom. The reflected rays exit the prism and are directed by a lens L2 onto a linear optical detector O. The detector O is a linear array of light sensitive pixels, each of which produces an electrical signal proportional to the level of light incident on it. Each pixel receives a bundle of light rays that reflect from interface I at a particular angle of incidence. If this angle of incidence is greater than the critical angle, then 100% of the rays in that bundle are reflected from the interface I. This is called total internal reflection (TIR). If this angle of incidence is less than the critical angle, then the rays are only partially reflected by the prism/sample interface, because a portion of the light is refracted into the liquid sample and, ideally, does not reach the detector. A pixel receiving partially reflected light will sense a lower intensity of light than a pixel receiving totally reflected light. The light intensity pattern on the array of pixels therefore provides a map of the amount of reflection at the prism/sample interface of the bundle of light beams corresponding to each pixel.

The refractive index of liquids changes significantly with temperature. It is important that the temperature of a sample is to be constant throughout its mass before an accurate reading can be taken. The thermally conductive prism (sapphire or similar) together with the sample dish and lid over it can help for achieving optimal thermal conductivity and low-volume containment of the sample which enables rapid thermal equilibration with the prism surface and subsequent temperature stability of the sample for the duration of the reading. A highly stable optical system coupled with a thermally self-regulating detection system, with enhanced resolution, provides accurate reading in the shortest possible time. An intelligent electronic control system coupled with a precision temperature sensor, which accurately pinpoints the prism surface temperature, enables the system to achieve and maintain the sample at the prescribed temperature. A powerful system of Peltier devices and thermal insulation ensures rapid attainment of sample target temperature. A separate multiple probe system may continuously monitor the internal environment of the instrument and actively compensate for any thermal fluctuations to optical and detector components.

Figure 2:
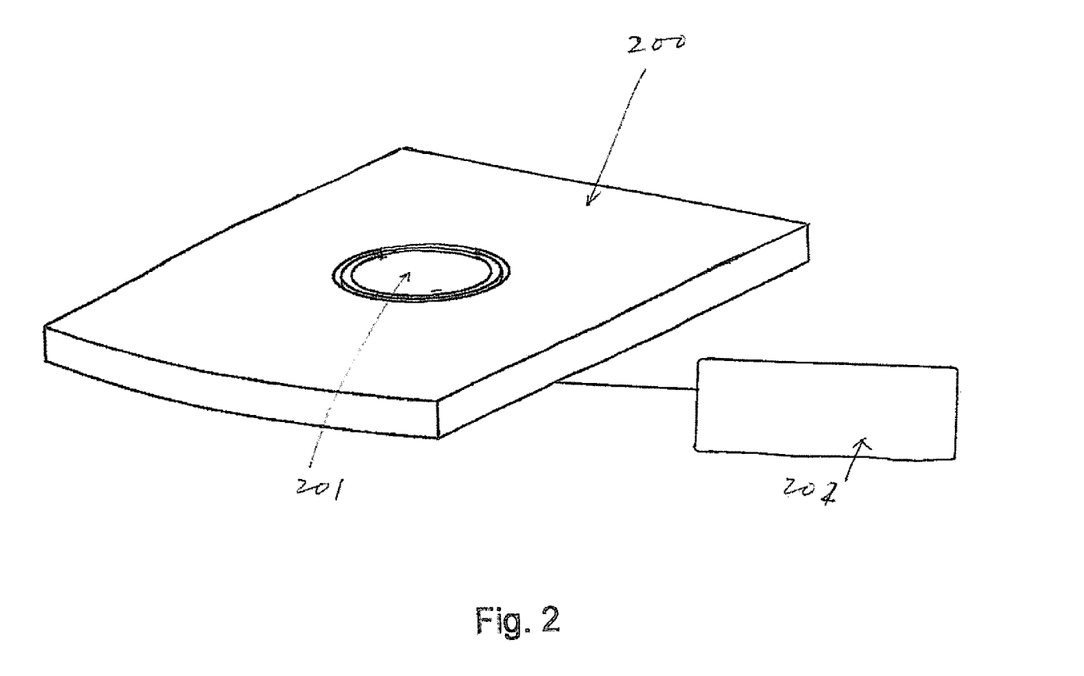
FIG. 2 illustrates a the measurement area of a critical-angle refractometer for testing refractive index of a solution with the associated controller FIG. 3 illustrate a perspective view of an apparatus for determining a refractive index n of a hydrogel contact lens according to the present invention.

Refractometers to measure the refractive index of liquid, for example a saline solution, based on critical-angle method and to maintain a sample to be constant temperature during measuring are available in the commercial market. For example, Rudolph Research Analytical (Hackettstown, N.J., USA). For example, the Rudolph J457 Automatic Digital Refractometer offers the automatic electronic temperature control (heating and cooling) and is able to make RI measurements at up to 120° C. Operating the Automatic J357 is to place a liquid sample on the artificial sapphire prism and reading the answer on the Digital Display on the computer. The FIG. 2 illustrates a digital refractometer (200) comprises Refractometer (201) connecting with a computer (202). The refractometer has a cavity (2011) at least measuring area is made from a prism material for receiving a liquid sample for testing. The cavity is concavely shaped.

The refractive index of contact lens changes with water content of contact lens.

The ability of a hydrogel lens to maintain its water-saturated state is essential for getting an accurate refractive index and dimensional stability. For water evaporates continuously from the surface of a hydrogel lens. Dehydration of a contact lens results in a change in the dimensions of the lens, hence dehydration has a direct effect upon dimensional and refractive index (RI) stability. Conventional contact lenses undergo a significant degree of dehydration during use and, accordingly, have a significant degree of dimensional and refractive index instability, particularly at higher water contents. It has also been well known that the refractive index of hydrogels is dependent upon the water content as described by Mousa G Y, Callender M. G., Sivak J G, Egan D J (1983) "The effect of hydration characteristics of hydrogel lenses." Int. Contact Lens Clin; 10:31. Therefore, it is important to maintain a hydrogel lens in its water-saturated state in order to obtain an accurate refractive index of hydrogels contact lens.

This application is partly based on the discovery that it is not able to use the commercial available refractometer used to measure refractive index of a solution, for example the Rudolph J457 Automatic Digital Refractometer, to accurately test a refractive index of the hydrogel contact lens. If the hydrogel contact lens is simply placed in the solution of the cavity, the refractive index obtained is greatly fluctuated by the amount of pressure applied to the contact lens. This application is also partly based on the discovery that the above problem is solved by designing a fixture having a truncated dome shape to create a small flat zone to hold the contact lens against the measurement window with consistent pressure. The fixture also allows weight to be placed on the fixture to provide different amount of pressure on the contact lens depending on the physical properties of the contact lens (modulus, water content, etc).

This application is further partly based on the discovery that a near-perfect contact of contact lens surface and the flat prism surface in the detection area is required achieve good signal for the refractive index measurement. There are two factors impacting the contact between lens surface and flat prism surface and these two factors are: a) the contact lens by design has curved surfaces; b) the contact lens by design have varying thickness from center to the lens edge by design; and the rate of thickness variation is dependent on the prescription power of the lens; and such variation in thickness from position to position on a given lens and from lens to lens and furthermore the prism interface has a small effective detection area makes it difficult to achieve good and consistent contact between the lens surface and prism surface.

This application is still further partly based on the discovery that the above problems are solved by designing a refractometer fixture to achieve good contact by overcoming the difficulties from above both factors by including the following three features: a) the lens is fitted onto a dome shaped fixture with raised edge which holds the lens in position without putting too much stress on the lens; a wet lens naturally stays with the fixture as the fixture is pivotally moved; b) a small flat zone on the dome matches with the flat prism surface at the detection area, applying a pre-determined pressure to the lens to achieve good contact; c) the dome design is such that the flat area on the dome is located well outside the optical zone where the lens thickness variation is relative small and independent with the prescription power.

Another important factor in achieving accurate refractive index reading is ensuring the contact lens is maintained at its natural state, i.e., fully hydrated and without excessive pressure applied to it (which may change its water content and refractive index is directly related to water content). The fixture design achieves this by having the lens fixture sitting in pool of solution and apply a pre-determined pressure to keep the lens in good contact with the prism surface; the amount of pressure is enough to ensure good contact between lens surface and prism surface but not too much to cause change in the water content of the lens.

The invention is also directed an apparatus for measuring a refractive index of a hydrogel contact lens comprising:

a refractometer, wherein the refractometer having a cavity to hold a solution and the hydrogel contact lens, wherein the cavity is concavely shaped to hold a liquid, temperature controlled, and contains a flat prism interface,
a refractometer fixture configured to be connected to the refractometer,
wherein the refractometer fixture comprising:
a fixture stage plate connected to the refractometer,
a fixture arm pivotally connected to the fixture stage plate which is adjustable X, Y, and Z positions,
a hydrogel contact lens fixture connected to the fixture arm and is pivotally moveable to apply a predetermined pressure to the hydrogel contact lens against the prism.

DETAILED DESCRIPTION

In the drawings, like reference numerals have been used throughout to designate identical elements. In the following disclosure, the present invention is described in the context of its use as a method and apparatus for measuring the refractive index of contact lenses. FIGS. 1 and 2 have been described in the above section.

Figure 3:
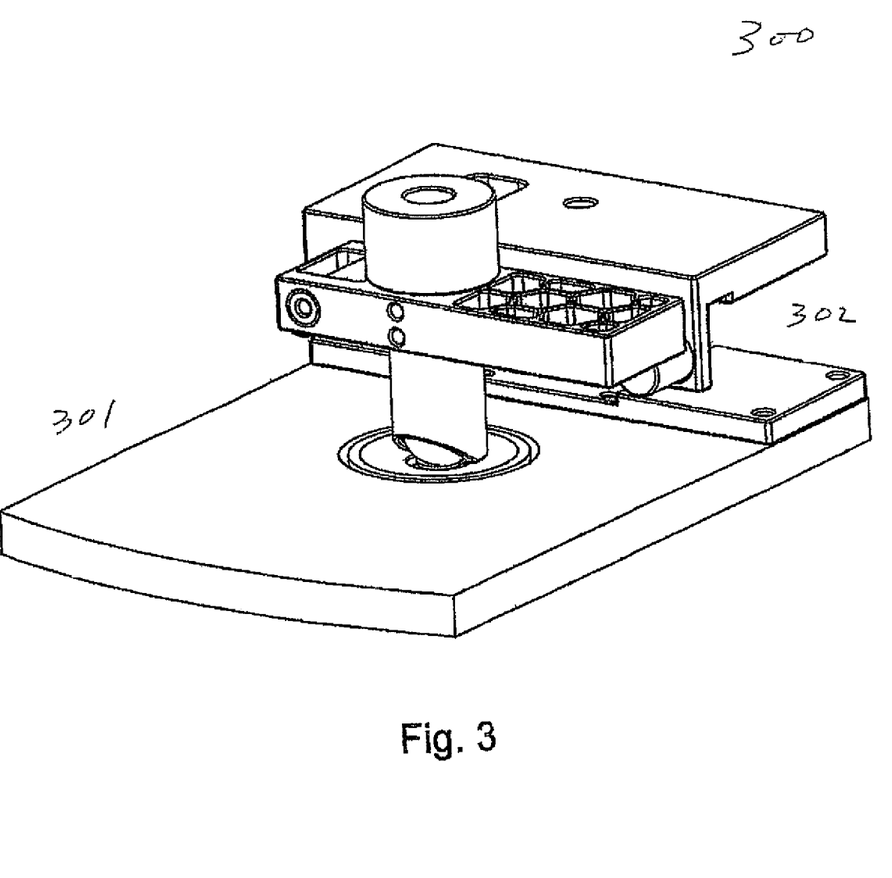

FIG. 3 illustrates a method and an apparatus for determining a refractive index n of a hydrogel contact lens according to the invention. The apparatus 300 comprises a refractometer 301 and a refractometer fixture 302. The refractometer fixture includes a fixture stage plate (400), a fixture arm (500), a contact lens fixture (600), which are illustrated below.

Figure 4:
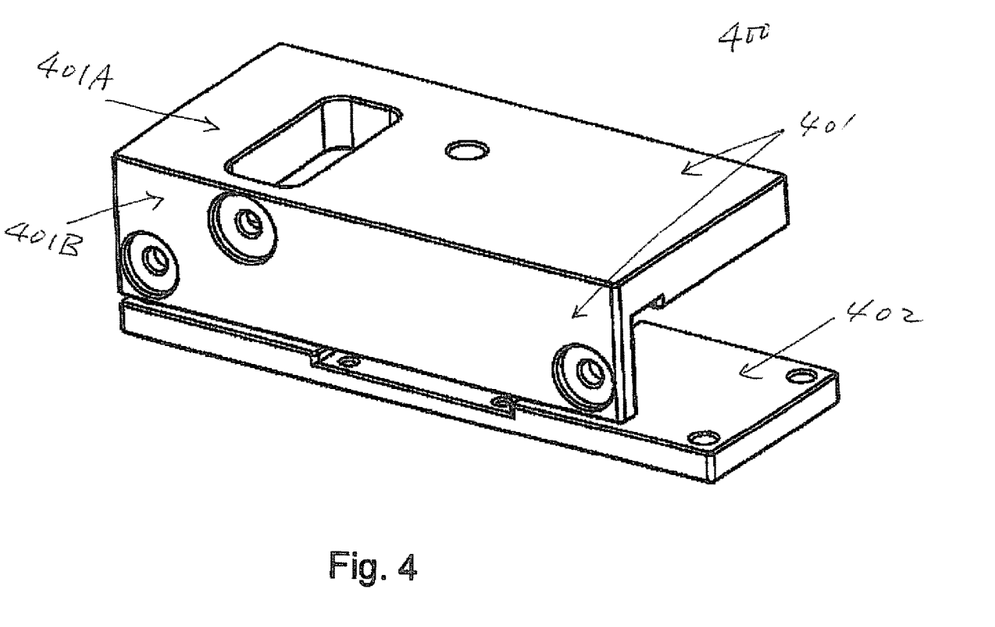
FIG. 4 illustrates a perspective view of a fixture stage plate according to the present invention.

FIG. 4 illustrates the fixture stage plate unit 400 which comprises a fixture top plate 401, a fixture bottom plate 402 and a XY stage 403 (not shown). The fixture top plate has two sides including one top piece (401A) and one front side piece (401B). The two sides are vertical with each other and are integral formed (single piece). The fixture top plate is connected with the XY stage (not shown) after the XY stage is fitted onto the fixture bottom plate.

Figure 5:
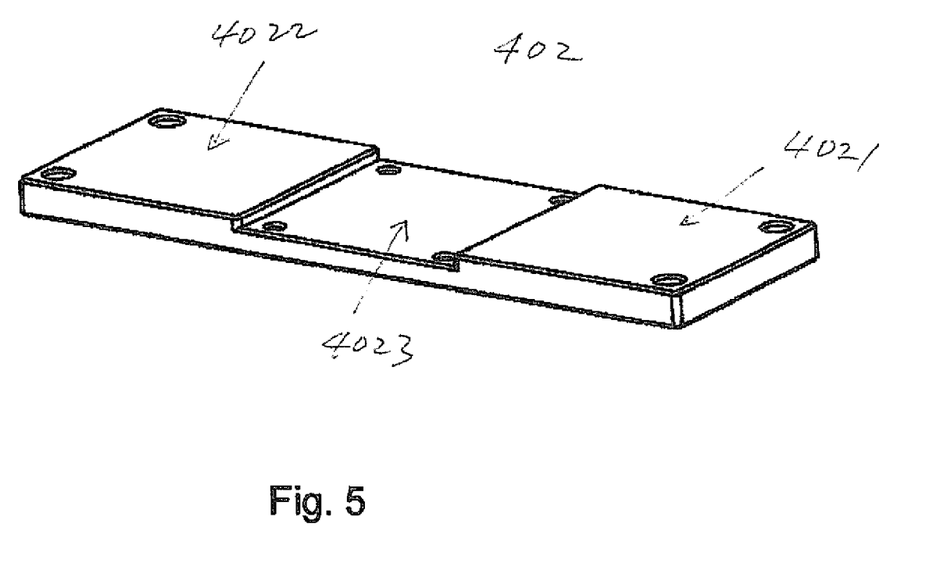
FIG. 5 illustrates a perspective view of a structure of a fixture bottom plate according to the present invention.

FIG. 5 illustrates a structure of the fixture bottom plate 402. The fixture bottom plate has a three-section structure (4021, 4021 and 4023) with the center section (4023) and two side sections (4021, 4022). The two side sections have the same dimensions (length, width and thickness). The center section 4023 has the same length and width to those of the two side sections but has a lower thickness than the two side sections.

Figure 6:
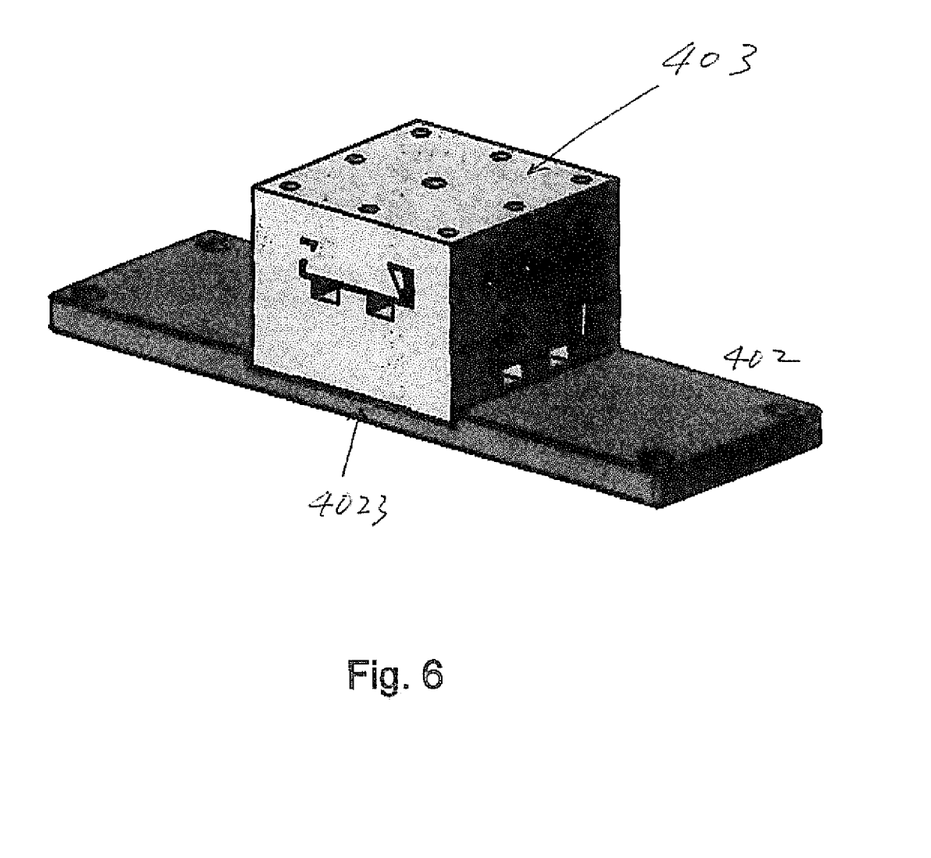
FIG. 6 illustrates a perspective view of a XY stage fitting onto the fixture bottom plate of FIG. 5 according to the present invention.

FIG. 6 illustrate a XY stage 403 fitting onto the center section (4023) of the fixture bottom plate 402. The XY stage is used to adjust nominal position of the measurement window (prism 310) by aligning it for centering purpose to achieve an accuracy of 10-50 microns. To align the fixture a contact lenses of varying type are placed on the fixture and the XY stage is adjusted to ensure consistent signal levels across lens types. If the fixture is not well aligned, then the variable thickness profile of a contact lens could cause erroneous measurements as saline would be allowed between the contact lens and measurement prism. This causes increased uncertainty within the measurement. The alignment ensures this uncertainty is eliminated across operators. After alignment, the stage is locked in place to prevent any motion during repeatative use.

Figure 7:
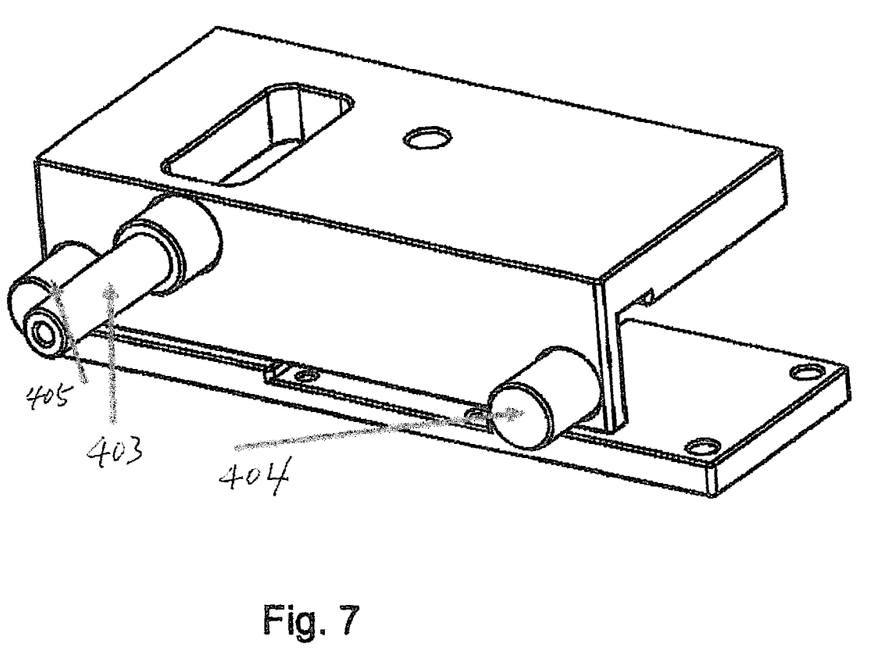
FIG. 7 illustrates a perspective view of a fixture stage plate of FIG. 4 with pivot pin and stop pin for rotating arm of the fixture.

FIG. 7 illustrates a pivot pin (403) and one stop pin 404 or optionally one another stop pin (405) on the vertical side plate (401B).

Figure 8:
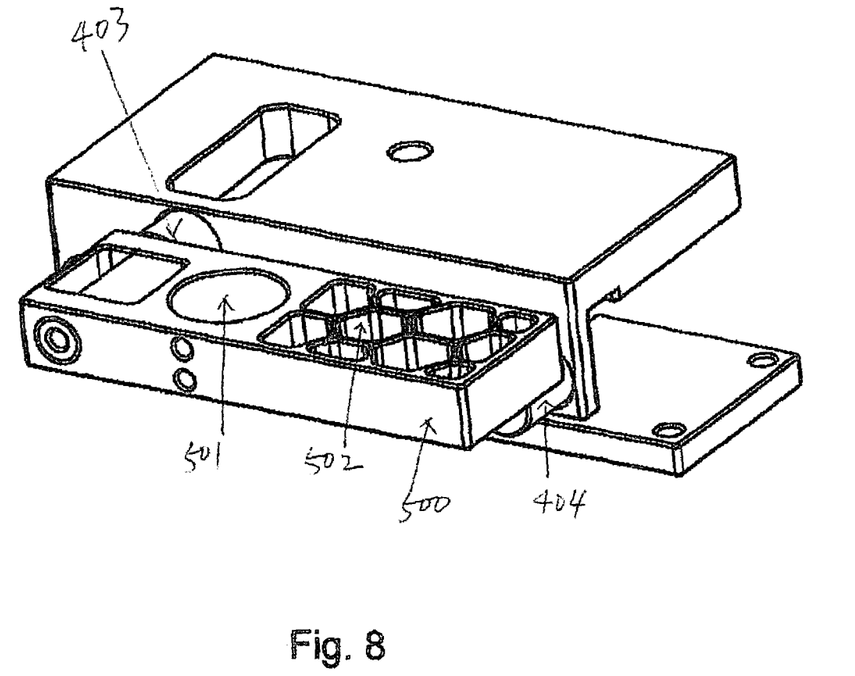
FIG. 8 illustrates a perspective view of a fixture arm attaching to the fixture stage plate of FIG. 4 with pivot pin and stop pin for rotating arm of the fixture.

FIG. 8 illustrates a fixture arm 500 pivotally connects to the side plate (401B) through the pivot pin (403). The fixture arm can pivotally move to left side or right side and rests upon the stop pin (404). The fixture arm has a bore 501 and a honeycomb structure (502). The fixture arm 500 is made from a plastic material while all other components are made a metal such as steel, aluminum, etc.

Figure 9:
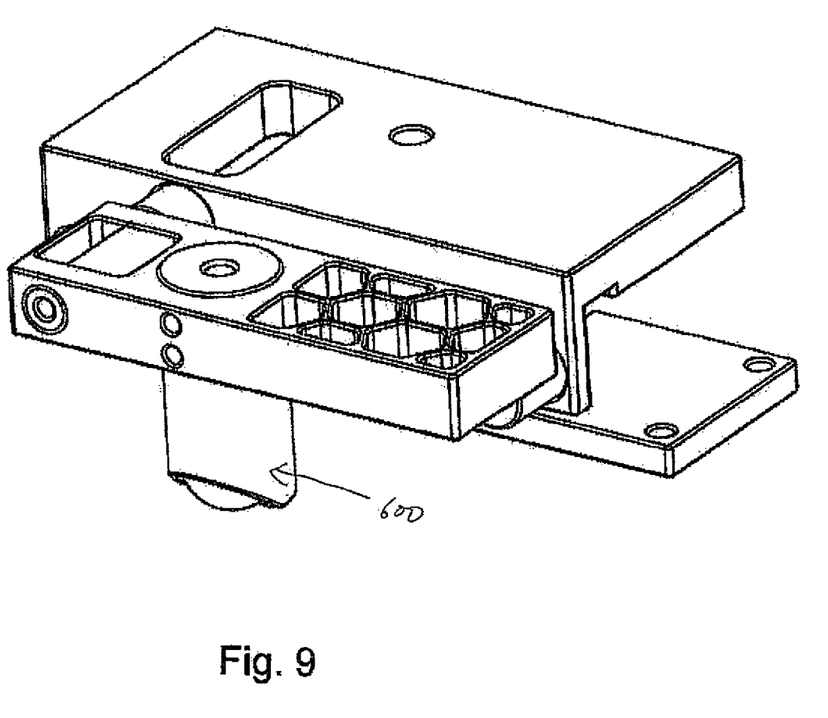
FIG. 9 illustrates a perspective view of a lens fixture attaching to fixture arm of FIG. 8.

FIG. 9 illustrates a cylinder-shape contact lens fixture 600 connects to the fixture arm 500 through the bore 501. The fixture arm is used to direct the contact lens fixture the press the hydrogel contact lens against a measurement window (a prism material) 2011 of the refractometer.

Figure 10:
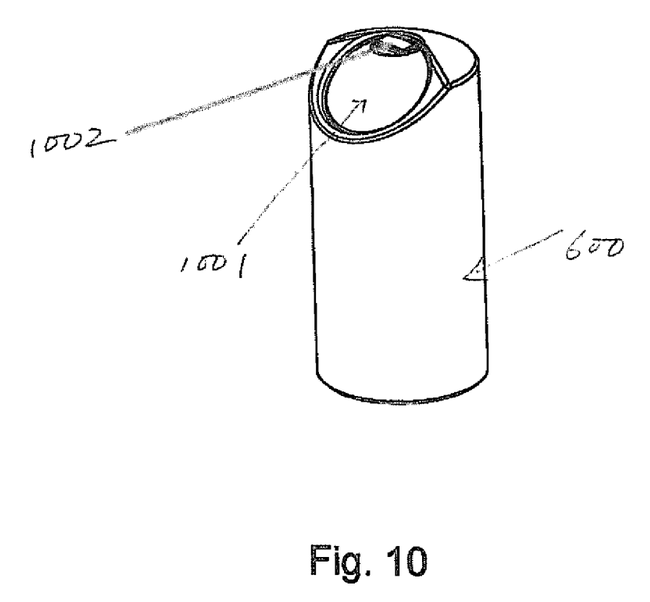
FIG. 10 illustrates a perspective view of a lens fixture having a titled dome and a flat zone to press the hydrogel contact lens for determining a refractive index n.

FIG. 10 illustrates a detail structure of the cylinder-shape contact lens fixture. The contact lens fixture has a truncated dome shape 1001 at one end to create a small flat zone 1002 to press the contact lens against the measurement window with a consistent pressure. Pressures may range from 1-20 psi depending on the material properties (modulus, water content, etc).

Figure 11:
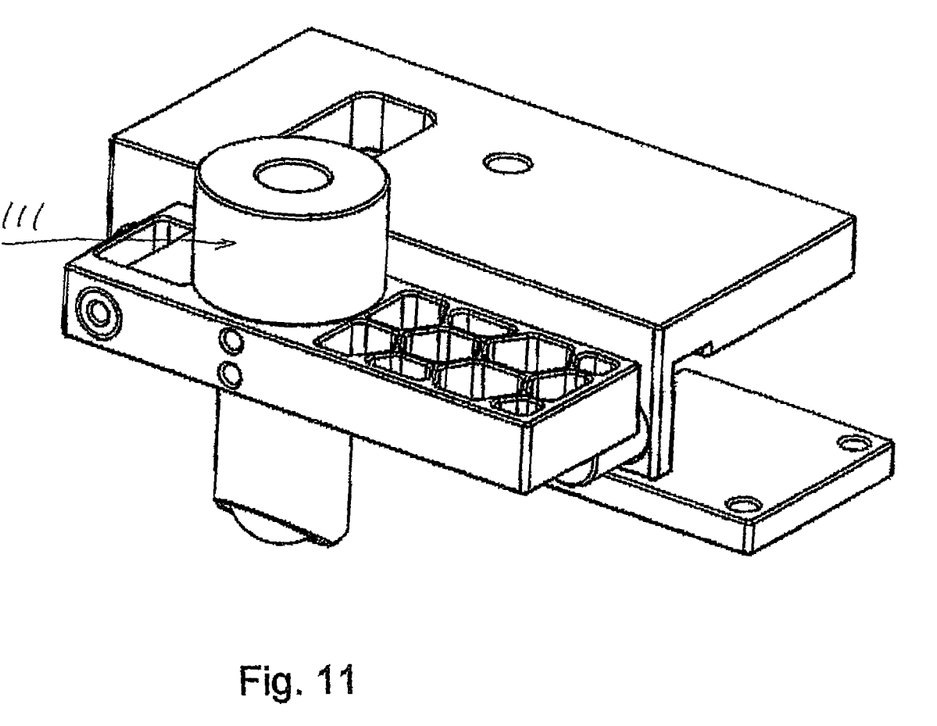
FIG. 11 illustrates a perspective view of a weight unit sitting on the top of lens fixture of FIG. 10

FIG. 11 illustrates a weight 111 to be placed on the contact lens fixture to provide different amount of pressure on the contact lens depending on the physical properties of contact lens (modulus, water content, etc). Weights may range from 0-200 g, to provide a total weight of 10-250 g depending on the specific fixture design.

The invention claimed is:

1. A method for measuring a refractive index of a hydrogel contact lens using a critical-angle refractometer comprising a flat prism interface surface, a light source that radiates light to the interface surface and a photoelectric sensor for receiving light reflected from the interface surface, the method comprising:
   a) adding a solution to a cavity, wherein the cavity is located on the top surface of the refractometer, concavely shaped and contains the flat prism interface at the bottom, and the prism has a small effective detection area,
   b) placing the hydrogel contact lens on the top of a flat zone of a contact lens arm fixture which is pivotally connected to the refractometer,
   c) pivotally turning the hydrogel contact lens arm fixture toward the cavity to contact the hydrogel contact lens with the liquid and the flat prism interface in the cavity, wherein the hydrogel contact lens maintains at saturating state by the liquid,
   d) applying a predetermined pressure on the hydrogel contact lens arm fixture to contact the hydrogel contact lens with the flat prism interface under the pressure,
   e) activating the critical-angle refractometer to measure the refractive index of the hydrogel contact lens after the step of d).

2. The method of claim 1, wherein the solution is saline.

3. The method of claim 2, wherein the predetermined pressure is from 1 PSI to 20 PSI.

4. An apparatus for measuring a refractive index of a hydrogel contact lens comprising:
   a refractometer, wherein the refractometer having a cavity to hold a solution and the hydrogel contact lens, wherein the cavity is concavely shaped to hold a liquid, temperature controlled, and contains a flat prism interface,
   a refractometer fixture configured to be connected to the refractometer,
   wherein the refractometer fixture comprising:
   a fixture stage plate connected to the refractometer,
   a fixture arm pivotally connected to the fixture stage plate which is adjustable X, Y, and Z positions,
   a hydrogel contact lens fixture connected to the fixture arm and is pivotally moveable to apply a predetermined pressure to the hydrogel contact lens against the prism.

5. The apparatus of claim 4, wherein the solution is saline.

6. The apparatus of claim 5, wherein the predetermined pressure is from 1 PSI to 20 PSI.

* * * * *